May 23, 1933.   J. F. WISEMAN   1,910,311
WINDSHIELD WIPER
Filed May 13, 1932
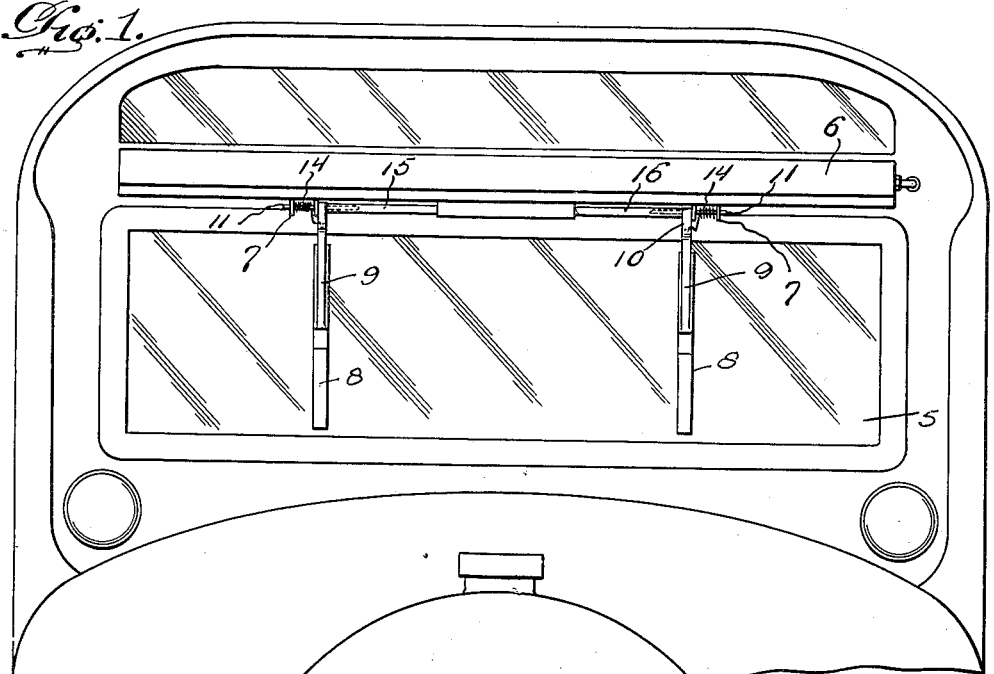
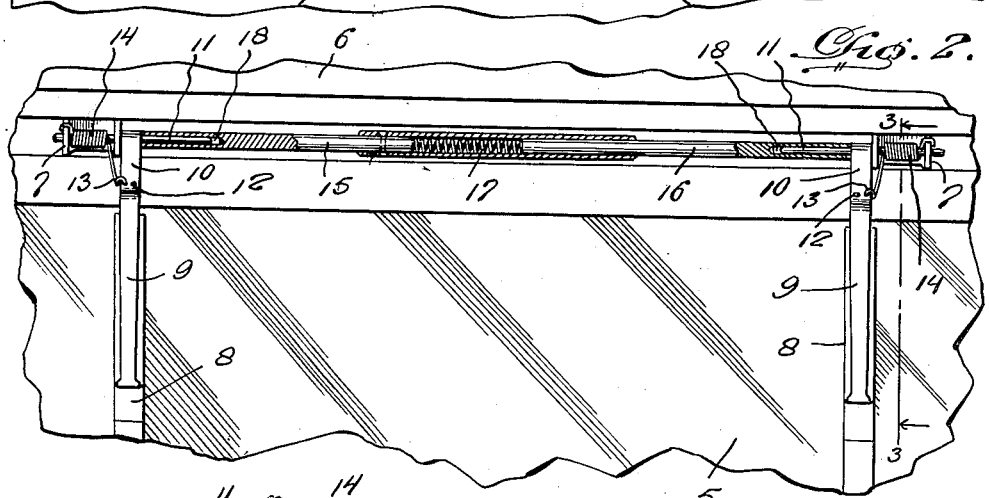
John F. Wiseman,
INVENTOR.
BY J. Stanley Bunch
ATTORNEY.

Patented May 23, 1933

1,910,311

UNITED STATES PATENT OFFICE

JOHN F. WISEMAN, OF DORCHESTER, MASSACHUSETTS

WINDSHIELD WIPER

Application filed May 13, 1932. Serial No. 611,189.

This invention relates to improvements in windshield wipers for motor vehicles, and has more particular reference to improved means for mounting the wiping elements of a windshield wiper having two reciprocable wiping element carriers, and in which each of the wiping elements is adapted to operate over approximately one-half the width of the windshield to provide a large field of clear vision for the driver.

The primary object of the invention is to provide improved means for mounting the two wiping elements of a windshield wiper of the above kind, whereby said wiping elements are effectively held in operative position against accidental displacement or loss, but whereby the wiping elements are permitted to be readily detached for replacement or repair.

Other objects and features of the invention will become apparent from the following description when considered in connection with the accompanying drawing, in which:

Figure 1 is a fragmentary front elevational view of a motor vehicle having a windshield wiper embodying the improvements constituting the present invention.

Figure 2 is a view somewhat similar to Figure 1 with parts broken away and in section to show details of the mounting means for the wiping elements; and Figure 3 is a fragmentary vertical section on line 3—3 of Figure 2.

In the drawing, 5 indicates the windshield of a motor vehicle along the upper edge of which is secured the casing 6 of the operating mechanism of a conventional type of windshield wiper. The casing 6 is usually of sheet metal and has a longitudinal opening along the lower edge or side thereof through which the wiper carriers 7 project. It will be understood that the wiper carriers 7 are reciprocated back and forth along the upper edge of the windshield by the usual operating mechanism, not shown, housed within casing 6, so that a wiping element of each carrier is adapted to operate over approximately one-half the width of the windshield. As is clearly shown in the several views, each wiper carrier 7 consists of a depending arm having a pair of spaced forwardly projecting ears in which is ordinarily pivoted the bent upper end of a wiper stem as illustrated in Patent No. 1,764,868 granted June 17, 1930 to William B. Gray, a spring being received by such bent end between the ears for cooperation with the latter and the wiper stem to press the wiping element yieldingly into engagement with the windshield, as will be apparent.

In accordance with the present invention, I provide wiping elements 8, each of which is provided with a sheet metal hanger arm or stem 9 whose upper end portion 10 is directed rearwardly and is provided at its free end with a rigid transverse pin 11 that projects similarly at opposite sides of the arm 9. Arm 9 is preferably formed of spring metal so as to be resilient or yieldable, and each projecting end of the pin 11 of each wiper carrying arm 9 is adapted for pivotal engagement in the ears of a wiper carrier 7. In this way, each hanger arm 9 is capable of mounting in either wiper carrier of the windshield wiper, one end portion of its pin 11 being engaged in the ears of the carrier, and the other end of said pin projecting inwardly. At the junction of the lower portion of arm 9 with its rearwardly directed upper end portion 10, said arm is provided with a pair of small openings 12, one of which is adapted to receive the hooked lower end 13 of the usual coil spring 14 which is used to swing the arm 9 rearwardly for yieldingly engaging the wiper element 8 of said arm into engagement with the outer surface of the windshield 5. In assembling the parts, the spring 14 is disposed to encircle the outer projecting end portion of the pivot pin 11 of the adjacent wiper element between the ears of the associated carrier 7, the remaining end of spring 14 being engaged with the outer ear of carrier 7 to prevent turning of the spring on the pin 11 so that said spring will act to press the wiping element into engagement with the windshield as described. Two openings are provided in the arm 9 as at 12 so that an opening to receive the hooked end 13 of spring 14 will be presented irrespective of which carrier 7 the arm 9 is associated with. In other words, the wiping elements are mounted at the inner side of both wiper carriers 7, and the hanger arms 9 are constructed for either right or left hand use with respect to the windshield or windshield wiper.

Means is provided for holding the wiping elements and their hanger arms 9 in operative position relative to the carriers 7 against accidental displacement or loss, which means is of a character to permit the wipers to be readily detached for replacement or repair. Such means consists of a resilient collapsible rod composed of telescopically connected sections 15 and 16 having a spring 17 interposed therebetween so that the rod is normally yieldingly extended, and provided in their outer ends with axial bores 18 to receive the inwardly projecting ends of the pivot pins 11 of the two hanger arms 9 for the wiping elements 8. The yieldably extended collapsible rod is thus interposed between the upper ends of the arms 9 so as to press and hold them apart against the inner sides of the carriers 7 so that the arms 9 are effectively prevented from becoming accidentally displaced from the carriers 7 and lost. When mounted in this way, the wiping elements 8 will move in unison back and forth across the windshield to properly function, the same being pressed against the windshield by springs 14 which swing the arms 19 rearwardly toward the windshield. Whenever detachment of the arms 9 with their wiping elements 8 is desired, the same may be readily accomplished, however, by manually collapsing the rod sections 15 and 16. For instance, the section 16 may be retracted out of engagement with the pin 11 of the right hand hanger arm 9 as viewed in Figure 2, by compressing spring 17. When the rod 16 has been disengaged from this pin, the rod 15 may be similarly disengaged from the pin 11 of the left hand hanger arm 9 as viewed in the same figure. Upon disengaging the hooked ends 13 of springs 14 from the arms 9, said arms may then be readily slid laterally toward each other to disengage their pins from the carriers 7, thus permitting ready removal of the hanger arms and their wiping elements for renewal or repair.

It will be seen that the construction described is extremely durable although comparatively simple and inexpensive. The sturdy character of the parts and the efficient way in which the hanger arms of the wiping elements are mounted insure long continued efficient operation, as well as convenient renewal and repair. The wiping elements 8 may be of the construction shown in my co-pending application for patent upon Windshield Wiper Ser. No. 543,956 filed June 12, 1931, wherein means is provided for feeding an anti-freeze solution into the holder member for the wiping member of the wiping element.

Minor changes are contemplated within the spirit and scope of the invention as claimed.

What I claim as new is:

1. In a windshield wiper, spaced reciprocable wiper carriers, wiping element hanging arms each having a rigid transverse pin at the upper end thereof and projecting from opposite sides of the same, said pins having their outer projecting portions pivotally engaged in the wiper carriers, a collapsible yieldably extended rod interposed between said arms and telescoped onto the inner projecting portions of the pivot pins to maintain the latter engaged with the wiper carriers, and springs anchored to the wiper carriers and encircling the first-named portions of the pivot pins and engaging the wiper element carrying arms to swing the latter rearwardly and yieldingly engage the wiping elements thereof with the windshield.

2. In a windshield wiper, a wiping element carrying arm formed of sheet metal and having a rigid transverse pin at its upper end projecting to opposite sides thereof, for selective pivotal engagement at either end in a wiper carrier, said arm having a pair of openings near the upper end and adjacent opposite side edges of the same for selective reception of the end of a spring for yieldably engaging the wiping element with the windshield substantially as and for the purpose described.

3. In a windshield wiper, a pair of spaced wiper carriers each having spaced ears, wiper element carrying arms of sheet metal construction having rigid transverse pins at the upper ends thereof and spaced openings therein adjacent opposite side edges thereof and near said upper ends, the outer portions of said pins being pivotally engaged in the ears of said wiper carriers, springs associated with the wiper carriers and engaged in the openings adjacent the outer side edges of said arms to normally swing the latter rearwardly and yieldably engage the wiping elements with the windshield, and a collapsible yieldably extended rod interposed between the arms and telescoped onto the inner projecting ends of said pins to removably maintain the latter engaged with the ears of the wiper carriers, said pins and openings permitting interchangeable association of the wiper element carrying arms with either wiper carrier and spring.

In testimony whereof I affix my signature.

JOHN F. WISEMAN.